United States Patent
Moodley (10) Patent No.: US 10,902,391 B2
(45) Date of Patent: Jan. 26, 2021

(54) AUTOMATED TRANSACTION SYSTEM (71) Applicant: CONTOUR TECHNOLOGY (PTY) LTD., Durban (ZA)

(72) Inventor: Somasundrum Kandasamy Moodley, Chatsworth (ZA)

(73) Assignee: CONTOUR TECHNOLOGY (PTY) LTD., Durban (ZA)

( * ) Notice: Subject to any disclaimer, the term of this patent is extended or adjusted under 35 U.S.C. 154(b) by 525 days.

(21) Appl. No.: 14/411,452

(22) PCT Filed: Jun. 24, 2013

(86) PCT No.: PCT/IB2013/055177
§ 371 (c)(1),
(2) Date: Dec. 26, 2014

(87) PCT Pub. No.: WO2014/001995
PCT Pub. Date: Jan. 3, 2014

(65) Prior Publication Data
US 2015/0339643 A1 Nov. 26, 2015

(30) Foreign Application Priority Data

Jun. 28, 2012 (ZA) .................. 2012/04842

(51) Int. Cl.
| G06Q 20/10 | (2012.01) |
| G06Q 20/40 | (2012.01) |
| G06Q 20/28 | (2012.01) |

(52) U.S. Cl.
CPC ......... *G06Q 20/1085* (2013.01); *G06Q 20/28* (2013.01); *G06Q 20/405* (2013.01)

(58) Field of Classification Search
CPC .. G06Q 20/405; G06Q 20/1085; G06Q 20/28; G07F 15/06
See application file for complete search history.

(56) References Cited

U.S. PATENT DOCUMENTS 4,240,030 A 12/1980 Bateman
4,731,575 A 3/1988 Sloan
(Continued)

FOREIGN PATENT DOCUMENTS

| CA | 2703131 | 12/1998 | |
| CA | 2703131 A1 * | 12/1998 | ........... G07F 19/209 |

(Continued)

OTHER PUBLICATIONS

S. K. Ali Zaidi, H. Masroor, S. R. Ashraf and A. Hassan, "Design and implementation of low cost electronic prepaid energy meter," 2008 IEEE International Multitopic Conference, Karachi, 2008, pp. 548-552. (Year: 2008).*

(Continued)

*Primary Examiner* — Mike Anderson
*Assistant Examiner* — Bolko M Hamerski
(74) *Attorney, Agent, or Firm* — Ladas & Parry, LLP (57) ABSTRACT

This invention relates to an automated transaction system, a method of operating the same, and to a method and system for vending a token for a prepaid service. The system essentially comprises a database storing rules to be applied by the system to financial transactions and a processor to direct operation of the system. In particular, the processor is operable to receive, in a real-time or near real-time, deposit data indicative of a deposit of a financial value made into a bank account held at a bank for a financial transaction for the purchase of goods and/or services. The processor is further configured to process the financial transaction requested and apply one or more stored rules to the processing of the determined requested transaction. The financial transaction may be for the purchase of tokens for a pre-paid service such as the provision of a commodity, e.g., electricity.

10 Claims, 6 Drawing Sheets

(56) References Cited

U.S. PATENT DOCUMENTS

| | | | | |
|---|---|---|---|---|
| 6,058,380 | A * | 5/2000 | Anderson | G06Q 20/102 705/40 |
| 6,243,693 | B1 | 6/2001 | Richards | |
| 6,553,353 | B1 * | 4/2003 | Littlejohn | G06Q 20/127 705/412 |
| 7,248,179 | B2 * | 7/2007 | Smit | H04Q 9/00 340/870.02 |
| 7,274,305 | B1 * | 9/2007 | Luttrell | B61L 1/20 324/141 |
| 7,849,007 | B2 * | 12/2010 | Thomas | G06Q 20/10 705/39 |
| 8,583,515 | B2 * | 11/2013 | Sorbe | G06Q 30/02 705/30 |
| 8,725,657 | B2 * | 5/2014 | Jarman | G06Q 20/145 705/412 |
| 2003/0158677 | A1 * | 8/2003 | Swarztrauber | G06Q 50/06 702/62 |
| 2003/0167178 | A1 * | 9/2003 | Jarman | G06Q 20/4012 705/412 |
| 2004/0111370 | A1 * | 6/2004 | Saylors | G06Q 20/102 705/40 |
| 2005/0021455 | A1 * | 1/2005 | Webster | G06Q 20/24 705/39 |
| 2005/0097320 | A1 * | 5/2005 | Golan | G06F 21/40 713/166 |
| 2006/0143124 | A1 * | 6/2006 | Ehrke | G06Q 20/102 705/40 |
| 2006/0212393 | A1 * | 9/2006 | Lindsay Brown | G06Q 40/02 705/40 |
| 2006/0213980 | A1 * | 9/2006 | Geller | G06Q 20/10 235/380 |
| 2007/0083479 | A1 * | 4/2007 | Swartz | G07F 15/003 705/412 |
| 2007/0260562 | A1 * | 11/2007 | Hutson | G06Q 20/14 705/412 |
| 2011/0288998 | A1 * | 11/2011 | McGraw | G06Q 40/00 705/44 |
| 2012/0101910 | A1 * | 4/2012 | Neri-Badillo | G01F 15/066 705/18 |
| 2012/0150736 | A1 * | 6/2012 | Dickerson | G06Q 20/405 705/40 |
| 2012/0166336 | A1 * | 6/2012 | Hartmaier | G06Q 20/105 705/44 |
| 2012/0226607 | A1 * | 9/2012 | Cataline | G06Q 40/02 705/40 |
| 2013/0198071 | A1 * | 8/2013 | Jurss | G06Q 20/3223 705/42 |
| 2013/0218798 | A1 * | 8/2013 | Ponnada | G06Q 30/0279 705/329 |
| 2014/0162598 | A1 * | 6/2014 | Villa-Real | G06Q 20/363 455/411 |

FOREIGN PATENT DOCUMENTS

| | | | | |
|---|---|---|---|---|
| CN | 2546849 | Y | | 4/2003 |
| CN | 2791612 | Y | | 6/2006 |
| CN | 201548600 | U | | 8/2010 |
| GB | 2323695 | A | | 9/1998 |
| GB | 2364420 | A * | 1/2002 | G06Q 20/127 |
| GB | 2414103 | A * | 11/2005 | G07F 15/06 |
| GB | 2438888 | A * | 12/2007 | G07F 15/06 |
| WO | 95/12859 | | | 5/1995 |
| WO | 01/86450 | | | 11/2001 |
| WO | WO-2004049270 | A2 * | 6/2004 | G07F 15/003 |
| WO | 2006/011019 | | | 2/2006 |
| WO | WO-2006011019 | A1 * | 2/2006 | G06Q 20/127 |
| WO | 2007/136986 | | | 11/2007 |

OTHER PUBLICATIONS

ISR for related PCT/IB2013/055177 mailed on Jan 30, 2014.

IPRP including the Written Opinion of the ISA for PCT/IB2013/055177 dated Dec. 31, 2014.

"Smart Metering Handbook", Fabio Toledo, p. 40 and Table of Contents, PennWell Books, 2013, from Google Books Limited Preview.

"Tolley's Basic Science and Practice of Gas Service", "Gas Service Technology vol. 1", 5th ed., John Hazelhurst, p. 230 and Table of Contents, Elsevier Ltd., 2009, from Google Books Limited Preview.

"Disablement/enablement functionality for smart gas meters," Department of Energy & Climate Change, London SW1A 2HD, UK, URN 10D/739, available at https://assets.publishing.service.gov.uk/government/uploads/system/uploads/attachment_data/file/42721/223-smart-disable-enable.pdf, Jul. 27, 2010, accessed Oct. 4, 2018.

Document 2: "Smart Metering Implementation Programme, Explanatory document to support the designation of the first version of the Smart Metering Equipment Technical Specifications (SMETS 1)," Department of Energy & Climate Change, London SW1A 2HD, URM 12D/487, available at https://assets.publishing.service.gov.uk/government/uploads/system/uploads/attachment_data/file/65685/7339-exp-doc-support-smets1.pdf, Dec. 2012, accessed Oct. 4, 2018.

"Cashpower Prepayment Metering Cashpower Gem Lite User Guide", Document version 0.10, Landis +Gyr (Pty) Ltd., Zug, Switzerland, Jun. 14, 2011.

"BEC23 Technical Manual", Rev. 5, Part No. 700034708000, Merlin Gerin SA (Pty) Ltd t/a Conlog, Durban, South Africa, 2006.

* cited by examiner

FIGURE 6

AUTOMATED TRANSACTION SYSTEM

CROSS-REFERENCE TO RELATED APPLICATIONS

This application is the U.S. National Stage of International Patent Application No. PCT/IB2013/055177 filed on Jun. 24, 2013, which claims priority to South African Patent Application No. 2012/04842, filed on Jun. 28, 2012 the disclosures of which are hereby incorporated in their entireties by reference.

BACKGROUND OF THE INVENTION

THIS INVENTION relates to an automated transaction system, a method of operating the same, and to a method and system for vending a token for a prepaid service.

Purchasing of goods and/or services remotely via a conventional banking channel usually involves a purchaser transferring funds to an account of a particular retailer and waiting for the retailer to provide the purchased good and/or services in due course. In certain cases, transactions tend to take some time to process, especially to receive the purchased goods and/or services, which undesirably inconveniences the purchaser.

A further problem arises in that certain transactions cannot be done remotely and purchasers of goods and services, e.g., prepaid electricity have to purchase vouchers or tokens for the same at a vendor physically. This problem is further exacerbated when purchasers live in remote locations, away from vendors, and/or the purchaser desires to proceed with a transaction during non-working hours.

The invention seeks to address the above problems in a different manner that presently addressed and/or to provide a different, more sophisticated automated transaction system to conventional transaction systems.

SUMMARY OF THE INVENTION

According to a first aspect of the invention there is provided a method of operating an automated transaction system, the method comprising:
  storing, in a database, one or more rules to be applied by the system to one or more transactions;
  receiving, in a real-time or near real-time, deposit data indicative of a deposit of a financial value made into at least one financial account associated with the system at a financial institution, wherein the deposit data comprises information indicative of the amount of financial value deposited and a system reference identifier identifiable by a processor of the system, wherein the system reference identifier is associated with at least one financial transaction requested;
  determining, from the system reference identifier, the at least one financial transaction requested;
  processing the determined financial transaction requested; and
  applying, by way of the processor, one or more stored rules to the processing of the determined requested transaction.

It will be appreciated that the processor carries out one or more of the steps above. The processing steps may be automatically carried out, optionally in response to a preceding step. The method may comprise operating the processor to perform the steps of the method described herein.

The method may comprise receiving the deposit data from a payment gateway server associated with a financial institution or bank at which the particular system financial or bank account is provided.

The method may comprise:
  identifying a user of or machine associated with the system from the received deposit data; and
  associating the amount of financial value deposited, or at least part thereof, with the identified user of or machine associated with the system.

The method may comprise transmitting data to the user.

The method may comprise generating the transaction confirmation message. The transaction may be a conventional transaction for the purchase of goods and/or services and/or vouchers therefor.

The method may comprise interrogating the system reference identifier to determine the identity of the user.

The method may comprise:
  receiving user information associated with the user or machine; and
  registering the user or machine to the system.

As part of the registration process, the method may comprise generating and storing in the database, a user profile associated with the user.

The method may comprise facilitating purchasing of a token for a service, the transaction confirmation message comprising information indicative of or associated with the token.

The method may comprise determining one or more rules to apply to the processing of the transaction, wherein the one or more rules are associated with the determined financial transaction requested and/or the identified user of or machine associated with the system.

The method may comprise receiving and storing, in the database, one or more rules pre-selected by a user of the system. For example, rules pre-selected for application to particular transactions.

The method may comprise:
  determining, by way of the processor, a risk profile of a user of the system; and
  selecting, by way of the processor, one or more rules for application to a particular transaction based on the determined risk profile of the user.

The deposit data may comprise a bank statement associated with the bank account and the system identifier is a bank beneficiary reference associated with the deposit of the financial value or sum of money.

The bank beneficiary reference may comprise one or a combination of a predetermined system defined/generated reference, a user selected reference identifiable by the system.

In some example embodiments, the reference may be a pro-forma type reference having a predetermined portion and a dynamic user selectable portion.

The method may comprise transmitting a transaction confirmation message associated with the transaction to the user in response to the transaction being processed by the system.

The method may comprise generating a voucher for goods and/or services purchased as per the financial transaction requested and transmitting the generated voucher wirelessly to a user requesting the financial transaction.

According to a second aspect of the invention there is provided an automated transaction system comprising:
- a database storing data; and
- a processor comprising:
    - a receiver module configured to receive, in a real-time or near real-time, deposit data indicative of a deposit of a financial value made into a particular bank account associated with the system, wherein the deposit data comprises information indicative of an amount of the financial value deposited and a system reference identifier identifiable by the system;
    - a transaction processing module configured, in response to the receiver module receiving the deposit data, to process the deposit data and use the system reference identifier to determine at least one financial transaction requested, and to process, or facilitate processing, in real-time or near real-time, the determined requested transaction; and
    - a rule processing module configured to apply one or more rules to the processing of the requested transaction.

The various modules of the processor, for example, the transaction processing module and the rule processing module may also operate in real-time or near real-time The system may also comprise:
- an identification module configured to use the deposit data to determine an identity of a user of or machine associated with the system associated with the deposit data; and
- an association module configured to associate the financial value deposited, or at least part thereof, with the identified user of or machine associated with the system.

The rule processing module may be configured to determine one or more rules to apply to the processing of the transaction by the transaction processing module, wherein the one or more rules are associated with the determined financial transaction requested and/or the identified user of or machine associated with the system.

The rules associated with the transaction may be determined by vendors of goods and/or services associated with the transaction.

The rule processing module may be configured to receive and store, in the database, one or more rules pre-selected by the user of the system or vendors of goods and/or services associated with the transaction.

The rule processing module may further be configured to select one or more rules for application to a particular transaction based on at least a determined risk profile of the user. For example, the system profiles the user as a bad payer. In other words, the rule processing module may be configured to apply one or more rules selected by the user, for example, during registration and/or selected by the system depending on a profile of the user stored in the database.

The user may be a human operator and the machine may be, for example, an electricity meter associated with the user or the system.

The rule processing module may be configured to apply one or more credit control blocking rules, vendor specific rules, and loyalty or discount rules on a transaction.

One of the vendor specific rules may be, for example, the user qualifies for a free electricity token. The vendor specific rules may be specified by the vendor of good and/or services associated with the transaction.

It will be appreciated that a plurality of bank accounts may be associated with the system at different banks. However, the system reference identifier may be the same across all banks.

The transaction processing module may be configured to generate the transaction confirmation message in response to the transaction being processed.

The receiver module may be communicatively coupled to a payment gateway server of a bank at which the bank account is provided thereby to receive deposit data therefrom.

The deposit data may comprise a bank statement associated with the bank account, wherein the receiver module comprises a bank statement interrogation module configured to periodically, or in real-time or near real-time on an ad hoc basis, receive and interrogate the received bank statement to determine information indicative of the amount of the financial value deposited and the associated system reference identifier, the system identifier comprising a bank beneficiary reference associated with the financial value deposited.

The particular bank account may be a system bank account associated with the system.

The identification module may be configured to interrogate the system reference identifier to determine the identity of the user or an associated machine.

The system may comprise a registration module configured to receive user information associated with a user and to register a user to the system.

The system may comprise a communication module configured to facilitate communication with the user, the communication module being configured at least to transmit a transaction confirmation message associated with the transaction to the user in response to processing thereof.

The transaction processing module may be configured to facilitate purchasing of a token for a service, the transaction confirmation message comprising information indicative of or associated with the token.

The transaction processing module may be configured to process, or facilitate processing, the requested transaction with the financial value deposited associated with the user in a conventional manner.

According to a third aspect of the invention, there may be provided a method of vending a token for a prepaid service by way of an automated transaction system, the method comprising:
- receiving, in a real-time or near real-time, deposit data indicative of a deposit of a financial value made into a particular bank account, wherein the deposit data comprises information indicative of the amount of financial value deposited and a system reference identifier identifiable by the system, wherein the system reference identifier comprises a bank beneficiary reference associated with the deposit of the financial value or sum of money;
- determining, from the deposit data, an identity of a meter associated with the deposit data, wherein the meter facilitates controlling provision of the service;
- associating the financial value deposited, or at least part thereof, with the identified meter;
- determining at least one token service token to be purchased;
- processing, via a processor, purchase of the determined service token to be purchased;
- applying, via the processor, one or more rules to the processing of the purchase of the determined service token to be purchased;

generating a transaction confirmation message comprising information associated with a purchased service token; and transmitting the transaction confirmation message in one or more selected wireless communication formats.

The service may be provision of a commodity such as electricity, water, gas, data, airtime or credit for same, or the like.

The wireless formats may be one or more of email, fax SMS, instant messaging, USSD messages, or the like.

According to a fourth aspect of the invention, there is provided a system, automated transaction system for vending a token for a prepaid service comprising:

a database storing data; and a processor configured to perform the steps of:

receiving, in a real-time or near real-time, deposit data indicative of a deposit of a financial value made into a particular bank account, wherein the deposit data comprises information indicative of the amount of financial value deposited and a system reference identifier identifiable by the system, wherein the system reference identifier comprises a bank beneficiary reference associated with the deposit of the financial value or sum of money;

determining, from the deposit data, an identity of a meter associated with the deposit data, wherein the meter facilitates controlling provision of the service;

associating the financial value deposited, or at least part thereof, with the identified meter;

determining at least one token service token to be purchased;

processing purchase of the determined service token to be purchased;

applying one or more rules to the processing of the purchase of the determined service token to be purchased;

generating a transaction confirmation message comprising information associated with a purchased service token; and transmitting, via a communication module, the transaction confirmation message in one or more selected wireless communication formats.

DESCRIPTION OF PREFERRED EMBODIMENTS

In the following description, for purposes of explanation, numerous specific details are set forth in order to provide a thorough understanding of an embodiment of the present disclosure. It will be evident, however, to one skilled in the art that the present disclosure may be practiced without these specific details.

Figure 1:
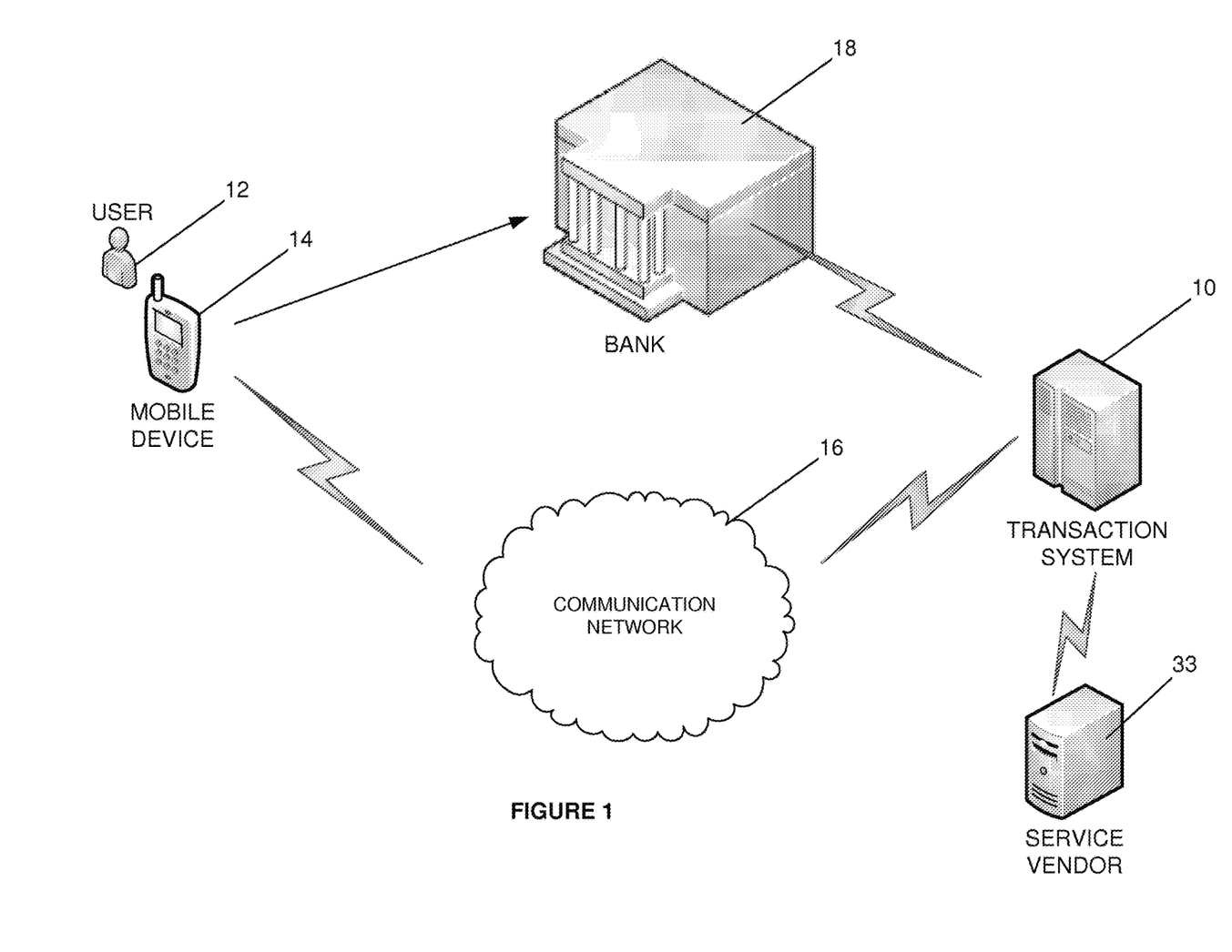
FIG. 1 shows a schematic drawing of a network incorporating an automated transaction system in accordance with an example embodiment.
Figure 2:
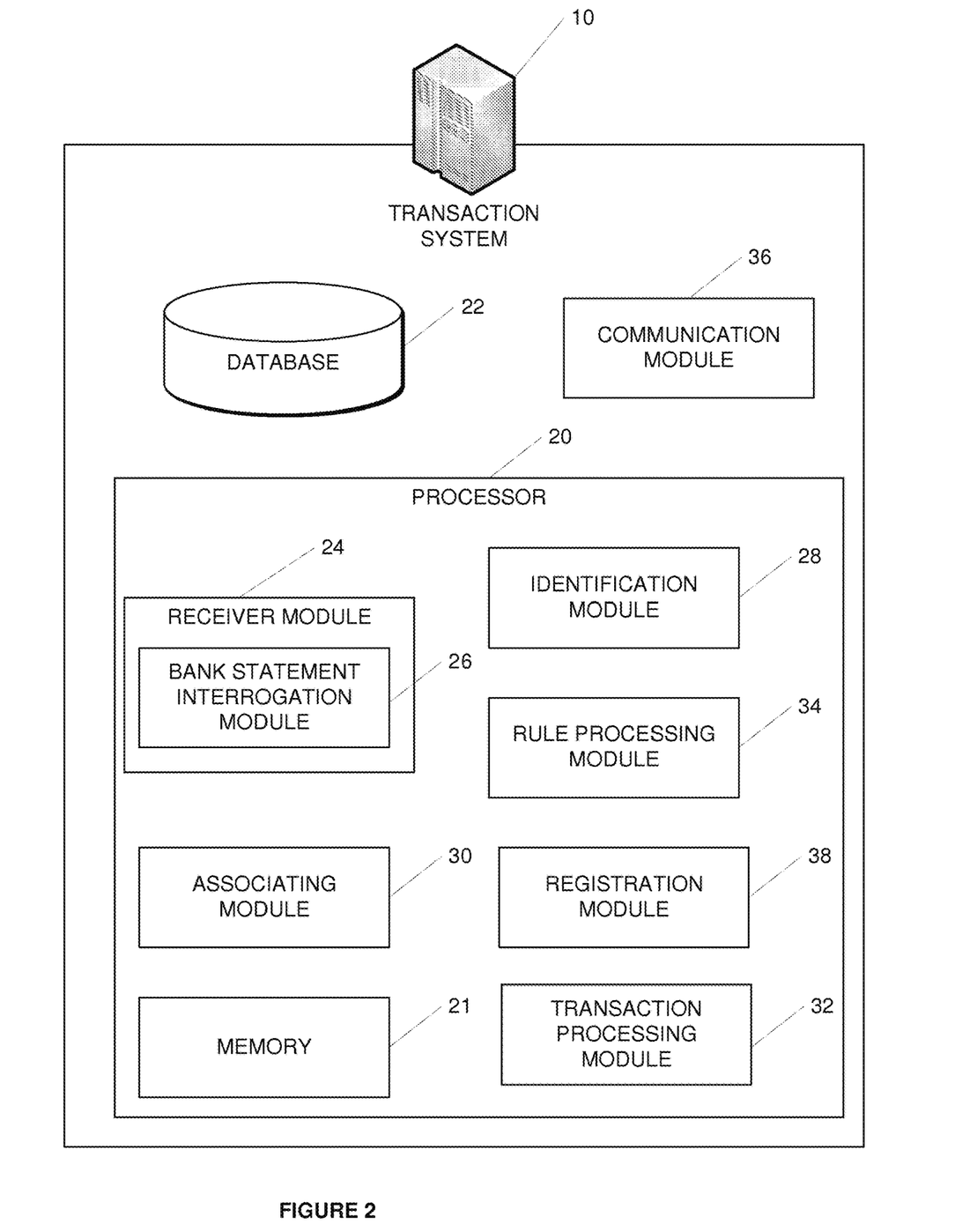
FIG. 2 shows a block diagram of the transaction system of FIG. 1 in greater detail.

Referring to FIGS. 1 and 2 of the drawings, a system in accordance with the present invention is generally indicated by reference numeral 10. The system 10 is an automated transaction system or a secure automated payment and service provision gateway configured at least to facilitate automated delivery of goods and/or a service to at least one user 12. In the example embodiment described, the system 10 is configured to remotely vend tokens or vouchers for pre-paid electricity to the user 12. However, it will be appreciated that the system 10 may be used purchase tokens/codes to prepaid airtime, for payment of services, e.g., purchases at retail stores, purchase of bus, airline, sporting event, show tickets, or the like. It will be appreciated that the system 12 may communicate with the user 12 via a communication device 14 (e.g., a mobile communication device or mobile telephone 14) over a communication network 16.

In some example embodiments, reference to the users 12 may also include reference to machines associated with the system 10 or the users 12, e.g., electricity meter/s associated with one or more users 12 or the system 10. In addition, reference to messages sent to the user 12 may be understood to be sent to (and received from) the user 12 via device 14.

The communication network 16 may be a cellular or mobile telecommunication network. Instead, or in addition, the network 16 may be a packet-switched network and may form part of the Internet. Instead, the communication network 16 may be a circuit switched network, public switched data network, or the like. It will be appreciated that the device 14 may be matched to the communication network 16 depending on the type of communication network 16 used.

Further, the system 10 is communicatively coupled to a financial institution, system or a bank 18, for example, on a host-to-host platform. In particular, the system 10 is communicatively coupled on a host-to-host platform to a back end system associated with the bank 18, for example, a payment gateway server via the communication network 16. It will be noted that the system 10 has an associated system financial or bank account at the financial institution or bank 14 as will be described further below.

In one example embodiment, the system 10 may be provided at one or more networked servers or application servers operatively connectable to the communication network 16 and communicatively coupled to the bank 18 to operate as described herein.

The system 10 may operate to be accessible to and usable by a plurality of users 12. However, only one is shown for ease of illustration. Similarly, the system 10 may be communicatively coupled to, and may have system bank accounts with a plurality of banks 18.

The system 10 comprises a processor 20 to direct operation of the system 10; and a database 22 for storing data.

The system 10, particularly the processor 20, comprises a plurality of components and modules which correspond to the functional tasks to be performed by the system 10. In this regard, "module" in the context of the specification will be understood to include an identifiable portion of code, computational or executable instructions, data, or computational object to achieve a particular function, operation, processing, or procedure. It follows that a module need not be implemented in software; a module may be implemented in software, hardware, or a combination of software and hardware. Further, the modules need not necessarily be consolidated into one device but may be spread across a plurality of devices, for example, on a plurality of networked servers at the same location or at spaced apart geographic locations.

It will be noted that the processor 20 may be programmed with software to control respective modules and components to achieve the desired functionality described herein. To this end, the database 22 (or memory 21 in the processor 20, main memory, and/or a hard disk drive) may carry a set of instructions to direct the operation of the processor 20. It will be understood that the processor 20 may be one or more microprocessors, controllers, or any other suitable computing device, resource, hardware, software, or embedded logic.

In particular, the processor 20 comprises a receiver module 24 configured to receive, in real-time or near real-time, deposit data in response to a deposit of a financial value being made into the system bank account. The deposit data comprises information indicative of the financial value deposited and a system reference identifier identifiable by the system 10. The receiver module 24 may be configured to be interfaced on a host-to-host platform with back-end computer systems associated with the bank 18 to receive the deposit data therefrom 24 hours a day, 7 days a week in a periodic fashion (e.g., every 5, 10 or 15 minutes, or hourly), or in a preferred real-time ad hoc fashion in response to a deposit being made to, or received in, the system bank account. Instead, or in addition, (not described further) the bank 18 may alert the receiver module 24 of each deposit made into the system bank account, for example, via the communication network 16 (e.g., via web services, VPN, or FTP).

It will be understood that the system reference identifier is the reference used, for example, by the user 12 when making a deposit into the system bank account. The system reference identifier may be a reference number, alphabetic code, or alphanumeric value selectable by the user 12 or generated by the system 12 as will be discussed below.

In certain example embodiments, the bank 18, particularly computer systems associated therewith, checks the reference identifier used by the user 12 (in an associated deposit reference field) when a deposit is made by the user 12 to determine whether or not the reference identifier is valid or not. The reference identifier may be interrogated by the bank (e.g., in real-time or near real-time) 18, or associated computer systems, in accordance with a particular algorithm supplied by the system 12 (may be the same across all banks associated with the system 10 when the system 10 has a bank account therewith). The reference checking may be applied for deposits made across all channels, i.e. branch deposits, EFT, ATM, physical bank deposits, bank transfers, cell phone banking transfers, internet transfers, etc. In other words, financial value or funds cannot be deposited into the system bank account without a valid reference identifier being used.

In yet a further example embodiment, the deposit data comprises a bank statement receivable by the module 24 periodically or preferably on an ad hoc basis in response to a deposit being made into the system bank account. To this end, the module 24 may comprise a bank statement interrogating module 26 configured to interrogate a received statement to extract the information indicative of the financial value deposited as well as the system reference identifier.

It will be appreciated that the same reference identifier may be used at all banks associated with the system 10, the system 10 having associated system bank accounts at the respective plurality of banks. In this way, a user can advantageously change banks with little or no effect on service delivery sought.

The processor 20 further comprises an identification module 28 configured to use the deposit data, particularly the system reference identifier, to determine an identity of the user 12 or machine (e.g. an electricity meter) associated with the deposit data. The identity of the user 12 determined may be associated with the user's specified communication method or in other words their associated MSISDN (Mobile Subscriber Integrated Services Digital Network Number), facsimile number, or email address. Instead, or in addition, the identity of the user 12 may comprise information indicative of the name, address, etc. associated with the user 12. It will be noted that in most example embodiments, the identity of the user 12 simply comprises one or more of their associated MSISDN of their mobile device 14, their email address, and their fax number.

In certain example embodiments, each user 12 of the system 10 (and/or electricity meter, as the case may be) may have a profile associated therewith and stored in the database 22. The profile may include information indicative of one or more of the MSISDN, fax number or email address associated with the user 12. The profile may be locatable by way of the system reference identifier which, as previously mentioned, is associated with user/s 12 (and/or the electricity meter/s) profiles in the database 22. Further, in some example embodiments, the electricity meter number may be associated with a particular user 12 in the database 22. It will be appreciated that depending on the application, it may be more practical to use one or both of a user's profile or a machine profile for processing transactions.

The system 10 may comprise an association module 30 configured to associate the financial value deposited, or at least part thereof, with the identified user 12 or electricity meter of the system 10.

The system 10 also comprises a transaction processing module 32 configured automatically to use the system reference identifier to determine at least one financial transaction requested by the user 12. The module 32 is further configured to process, or facilitate processing, the determined requested transaction.

To this end, the transaction processing module 32 may be communicatively coupled to various providers or vendors of goods and/or services 33. For example, in the embodiment described, the module 32 may be communicatively coupled to a vendor 33 of prepaid electricity such a municipal utilities system, a commodity service provider, or the like. It will be noted that the system 10 may also optionally communicate with the vendor 33 via the communication network 16. In some example embodiments, the module 32 may be communicatively coupled to vendor of tickets for shows, sports events, etc. The module 32 may facilitate a purchase of the requested goods and/or service on behalf of the user 12 and may therefore have an associated account at each vendor which the system 10 is associated with. It will be understood that this need not be the case, for example, the system 10 may have pre-purchased tokens for prepaid electricity which the module 32 may use to process the transaction for purchase of the same.

The transaction processing module 32 may be configured to generate the transaction confirmation message in response to the transaction being successfully processed. In transactions for the purchase of prepaid electricity, the message may contain a token or voucher number for the prepaid electricity. Similarly, the module 32 is configured to generate a suitable message if the transaction could not be processed.

In a preferred example embodiment, the system 10 advantageously comprises a rule processing module 34 configured automatically to apply one or more rules to the processing of the requested transaction. The rules may be business processing rules for a particular determined transaction. The rule processing module 34 may be configured to determine one or more rules to apply to the processing of the transaction, wherein the one or more rules are associated with the user 12, e.g., depending on the profile of the user 12 stored in the database 22. It will be noted that within the profile of the user 12 is stored a risk profile associated with the user as determined, for example, by the module 34.

The rule processing module 34 may be configured to apply one or more rules selected by the user 12. For example, the user 12 may select a rule regarding payments for prepaid electricity such that for every deposit made, 80% of the amount deposited is processed for purchase of a prepaid electricity token and the remaining 20% may go towards paying an existing debt (e.g., an external municipal debt for rates, water, refuse, sewage, etc.). The rule processing module 34 may be configured to apply one or more rules for a particular determined transaction, for the example above, the rule could potentially only be applicable to a purchase of electricity.

Instead, or in addition, the rule processing module 34 is configured to apply one or more system rules to the transaction, wherein the system rules are provided by the system 10 depending on various factors such as previous payment history of the user 12, customer specific information (age, demographics, income levels, etc.), risk profile associated therewith, or the like.

The module 34 advantageously makes remote automated transactions more sophisticated as the transaction are not processed by the module 32 without the module 34 operating to apply rules to the transaction. It will be understood that for some users 12 of the system 10, the at least one rule applied by the module 34 may be that no rules be applied to the processing of the transaction. In this way, the system 10 and the present invention provides a user 12 with an opportunity to tailor their transactions to their specific requirements or needs.

The rule processing module 34 may be configured to apply one or more specific credit control blocking rules, additional vendor specific rules (e.g., the user qualifies for a free electricity token), and loyalty or discounts on a transaction.

In a preferred example embodiment, tokens are generated based on a financial value left after business rules are applied thereto by the module 34. The tokens are thus generated in real-time by the module 32.

The system 10 also comprises a communication module 36 configured at least to transmit data, for example, the transaction confirmation message, to the user 12. The communication module 36 may comprise associated electronics and/or software (e.g., a GSM (Global System for Mobile communication) modem, or the like) to match the communication network 16 so that the system 10 may communicate via the same. It will be noted that in certain example embodiments, the module 32 is also configured to communicate with other entities, for example, the bank 18 and/or vendors also by way of the module 36. In any event, the module 36 operating over the communication network 16 may preferably provide a real-time delivery channel.

The module 36 may be configured to transmit transaction confirmation messages to the user 12 via facsimile, IM (instant messaging), social media, social networks, SMS (Short Message Service), USSD (Unstructured Supplementary Service Data) messages, or email.

The system 10, particularly the processor 20, may comprise a registration module 38 configured to receive user information associated with a user 12 and to register the user 12 to the system 10. The registration module 38 may be configured to receive a registration request message from the user 12 via the communication network 16 by way of the communication module 36. In one example embodiment, the registration request message may be in the form of an SMS message received by the module 36. However, it will be appreciated that this could be done in a plurality of ways, for example, via a registration webpage associated with the system 10, via a call centre, or the like.

The module 38 may be configured to receive, and optionally also prompt, the user 12 for information identifying the goods and/or service associated with the transaction (e.g., a meter number), as well as their preferred communication method (SMS, email, or fax) for the transmission of the transaction confirmation message and associated contact details MSISDN (Mobile Subscriber Integrated Services Digital Network Number), fax number, or email address).

The module 38 may be configured to interrogate the received data and if the received data does not appear to be valid, a suitable message is sent to the user 12. For example, "The meter number you have provided is not valid." Or, "You a not registered on the system, please contact your local call centre."

On successful registration, the module 38 creates a profile for the user 12 and stores the same in the database 22. As part of the registration, the user 12 may select one or more rules for application by the module 34 as hereinbefore described. The rules may be stored/associated with the profile of the user 12 in the database 22.

It will be appreciated that transaction histories of previous transactions associated with the user 12 may be stored with the profile of the user 12 thereby at least to trend the transactions of the user 12 as well as to enable the module 34 to determine if one or more system rules may be applicable to for transactions associated with a particular user 12. For example, consistent users 12 of the system 10 may have discount rules applied in respect of transactions made thereby by way of the system 10.

The module 38 may be configured to generate the system reference identifier, assign the same to the profile of the user 12 and transmit the same as part of a registration confirmation message (described below) sent to the user 12 via email, SMS, or fax. In other example embodiments, the reference is selected by the user 12, or may simply be the electricity meter number, for example.

Figure 3:
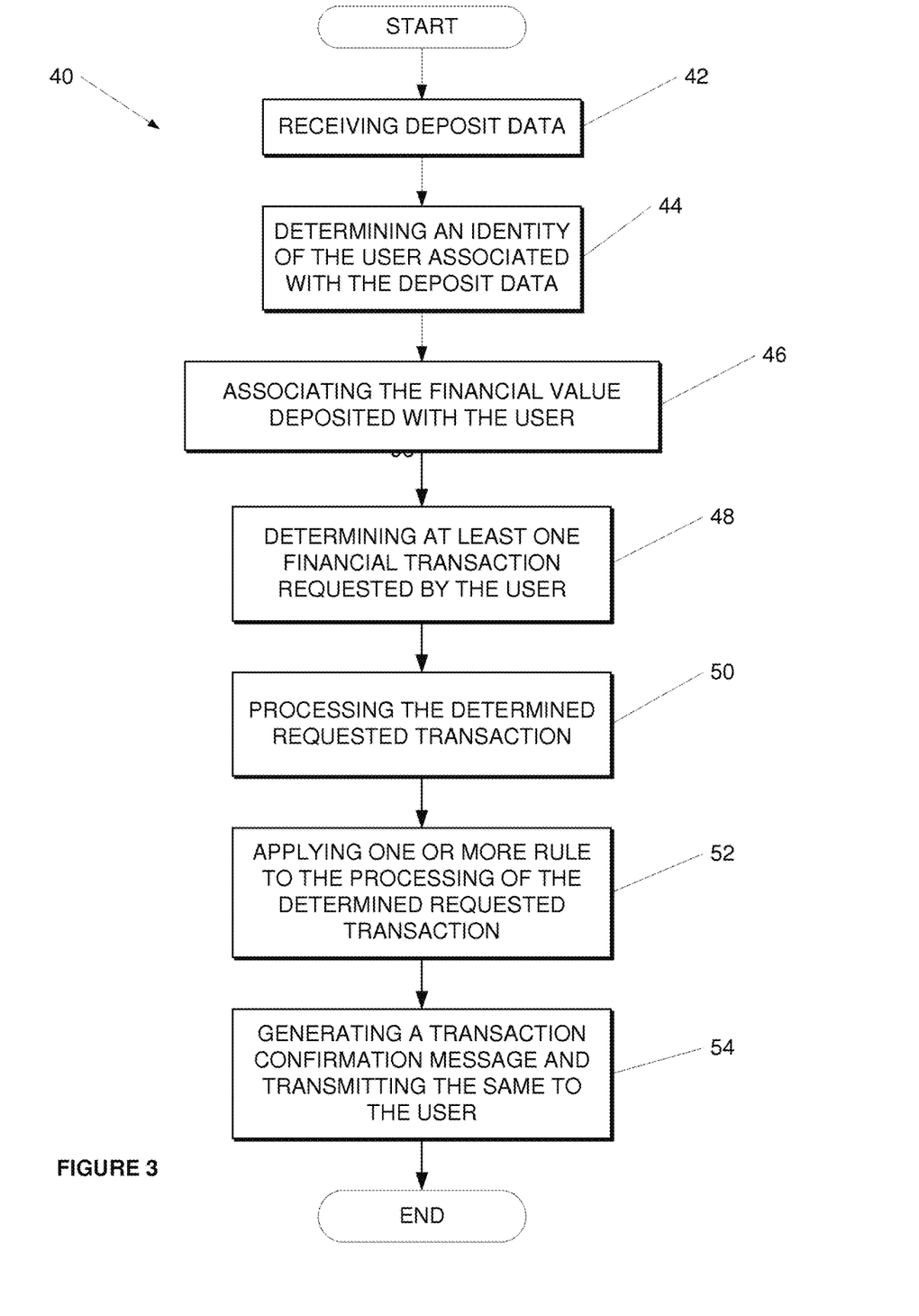
FIG. 3 shows a flow diagram of a method in accordance with an example embodiment of the present invention.
Figure 4:
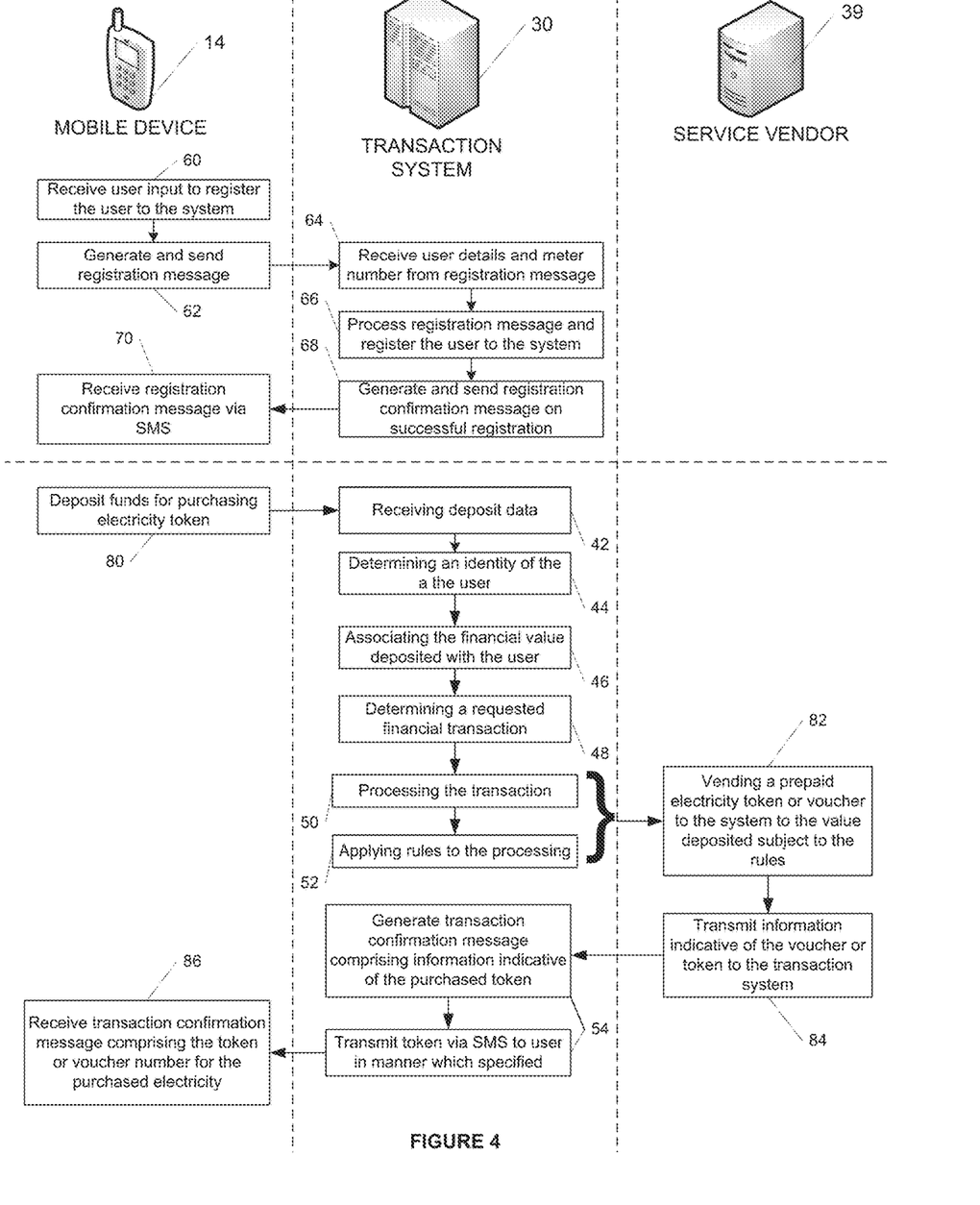
FIG. 4 shows a line/process flow diagram of a method in accordance with an example embodiment.

Example embodiments will now be further described in use with reference to FIGS. 3 & 4. The example methods shown in FIGS. 3 & 4 are described with reference to FIGS. 1 & 2, although it is to be appreciated that the example methods may be applicable to other systems (e.g., the system of FIG. 5 and those systems not illustrated) as well.

Referring first to FIG. 3 of the drawings where a flow diagram of a method in accordance with an example embodiment is generally indicated by reference numeral 40. The method 40 is discussed with the example embodiment for a purchase of prepaid electricity by the user 12 by way of the system 10 as previously described. In this regard, the method 40 is a method for operating the system 10 to the aforementioned end.

In particular, it will be appreciated that the user 12 may deposit, with bank 18, a sum of money into a particular system bank account associated with the system 10, the sum of money deposited being indicative of the amount of prepaid electricity the user 12 desires to purchase. The user 12 also includes the relevant system reference identifier corresponding to the desired transaction into the relevant beneficiary reference field, as part of the transaction. The reference identifier may be associated with a particular electricity meter. In this way, it will be appreciated that for each electricity meter associated with the user 12 or each separate transaction which the user 12 desires, they will have to register with the system 10 thereby to obtain different system reference identifiers. The different identifiers may be stored in the profile of the user 12 in the database 22.

It will be reiterated that the method of deposit is irrelevant as the deposit may be done via EFT, an ATM, or the like. However, it is critical that the reference is correct. As mentioned, in some example embodiments, the bank 18 may determine that if the reference is valid or not. If not valid, the bank 18 will not allow the deposit to be made.

In any event, the method 40 comprises the step of receiving, at block 42 via module 24 or module 26, in a real-time or near real-time, deposit data indicative of the deposit of financial value made into the system bank account as hereinbefore described. The deposit data is received periodically (every 15 minutes, hourly, daily, or configurable) or on an ad hoc basis as described above. It will be appreciated that step 42 may comprise downloading or retrieving the deposit data from the bank statement or transaction information of the bank 18. In addition, the method may comprise operating the module 26 to poll or interrogate an electronic version of the bank statement for each deposit of a financial value made into the system bank account thereby to receive deposit data therefrom.

The method 40 then comprises determining, at block 44, from the system reference identifier, an identity of the user 12 of the system 10 associated with the deposit data. This step is typically accomplished by way of the identification module 28 and may be done in a plurality of ways. For example, the module 28 may search across all identifiers in the database 22 and returns a profile of the user 12 associated with a matched system reference identifier.

The method 40 then comprises associating, at block 46 via the associating module 30, the financial value deposited with the identified user 12 of the system 10.

It will be noted that steps 44 and 46 may be optional and, in addition, the user 12 may in effect be the electricity meter associated with the user 12 for the purpose described herein as hereinbefore described.

The method 40 further comprises determining, at block 48, from the system reference identifier by way of the module 32, at least one financial transaction requested by the user 12. In other words, method 40 comprises determining from the system reference identifier that the user 12 desired to purchase prepaid electricity. This is typically because the reference identifier comprises a code to facilitate said determination, for example, a meter number.

The method 40 comprises processing, automatically, at block 50, the determined requested transaction by way of the transaction processing module 32 as hereinbefore described.

The method 40 then advantageously comprises applying, automatically, at block 52, one or more rules to the processing of the determined requested transaction for purchase of prepaid electricity. For example, for the financial value deposited, 80% of the value is used to purchase prepaid electricity whereas the remaining 20% of the deposited value is used for payment of a debt.

The method may comprise, at block 54 via the module 32, generating and transmitting a transaction confirmation message associated with the transaction to the user 12. It will be understood that the transaction confirmation message may comprise an electricity token or voucher number which will enable the user 12 to access the service purchased via the electricity meter. In other example embodiments, the module 32 facilitates loading of the requested financial value on the electricity meter remotely and such that the transaction confirmation message is merely a confirmation of a successful transaction.

Turning now to FIG. 4 of the drawings, a line/process flow diagram of the steps for registering a user 12 to the system 10 and facilitating purchasing of prepaid electricity via the system 10 is illustrated. Similar steps of the method 40 of FIG. 3 are also included in FIG. 4 and will be identified by like reference numerals.

It will be appreciated that a user 12 will register to use the system 10, for example, via the mobile communication device 14. In particular, the mobile device 14 receives, at block 60, user input in order to register for use of the system 10. It will be appreciated that the user input may comprise the electricity meter number which the user 12 desires to load with financial value to and data indicative of their preferred method of communication e.g. SMS, email, or fax (which will be used to identify the user 12). In certain example embodiments, the user 12 may include one or more rules which they desire to be applied to their transactions.

Once entered, the device 14 generates and sends, at block 62, the user input in an SMS format to a number associated with the system 10 (entered by the user 12). It will be noted that the registration message could be sent via email, fax, or via a call centre. However, in the example embodiment described, the number associated with the system 10 is a dedicated SMS gateway number.

The registration module 38 may receive, at block 64, via the communication network 16 by way of the communication module 36, the registration message from the user 12. In particular, the module 38 is configured to receive the meter number and the identity of the user 12 in the form of the MSISDN associated with the user 12.

The registration module 38 then processes, at block 66, the registration message to generate a profile for the user 12 and associates the meter number with the received MSISDN in the database 22. In this example embodiment, the meter number and MSISDN form part of the user profile. Any rules selected by the user 12 are also associated with the profile in the database 22. In addition, in some example embodiments, the module 38 may generate a specific system reference identifier for use by the user 12.

It will be appreciated that the user 12 will have to register for each electricity meter which they desire to transact for. Each meter number may be associated with the same user 12 (or appropriate contact details) accordingly. In some example embodiments where a meter is registered with the system 10, it will be noted that anybody may purchase electricity therefor.

On a successful registration, the module 38 is configured to generate and send, at block 68 to the user 12, on the associated MSISDN, a confirmation message to that effect. The confirmation message may include the system reference identifier generated by the system (e.g., the received meter number) or simply provided by the user 12 (e.g., user specific identifier "mymeter123"). For example, the confirmation message for a successful registration may comprise:

"Congratulations, you may now purchase electricity at any participating bank via Cell-phone banking, ATM, tellers, and Electronic Fund Transfers (EFT)—use XXXXXXXXXXX as a reference whenever using this facility"

If the registration was not successful, for example, an invalid meter number was provided; the module 38 may send a suitable response accordingly as described above.

The user 12 may receive, at block 70, the confirmation message from the system 10 via the communication network 16 in the form of an SMS.

When the user 12 desires to purchase prepaid electricity they may deposit, at block 80, money or funds for the purchase of the prepaid electricity token into the system bank account at bank 18, for example, via cell phone banking. The user 12 uses, as a reference for the transaction, the system reference identifier provided to the same in the registration confirmation message. Should the user 12 have more than one meter, the user 12 would have to specify the meter which they desire to transact for by way of the relevant system reference identifier.

Once the funds are deposited into the system bank account, the steps 42 to 54 as described with reference to FIG. 3 are performed.

However, it will be noted that when steps 50 and 52 are performed, they may include communicating with a vendor system 39 to purchase the prepaid electricity tokens therefrom. The vendor system 39 may optionally be provided at a municipality which vends prepaid electricity to its constituents, for example, in a conventional manner.

In particular, the vending system 39 is configured to vend, at block 82, a prepaid electricity token or voucher to the system 10 for the amount determined by the module 32 with the rules applied by the module 34.

It will be appreciated that, as mentioned above, the system 10 may have a bulk purchase of prepaid electricity which it may vend to the user 10. The module 32 therefore processes the transaction to generate a token or voucher number for the transaction confirmation message described below (and previously).

The system 39 then transmits, at block 84, information associated with the purchased electricity voucher or token to the system 10 for processing by the module 32 as hereinbefore described.

The user 12 then receives, at block 86, the transaction confirmation message comprising the token data (STS token) for use thereby to access electricity.

Figure 5:
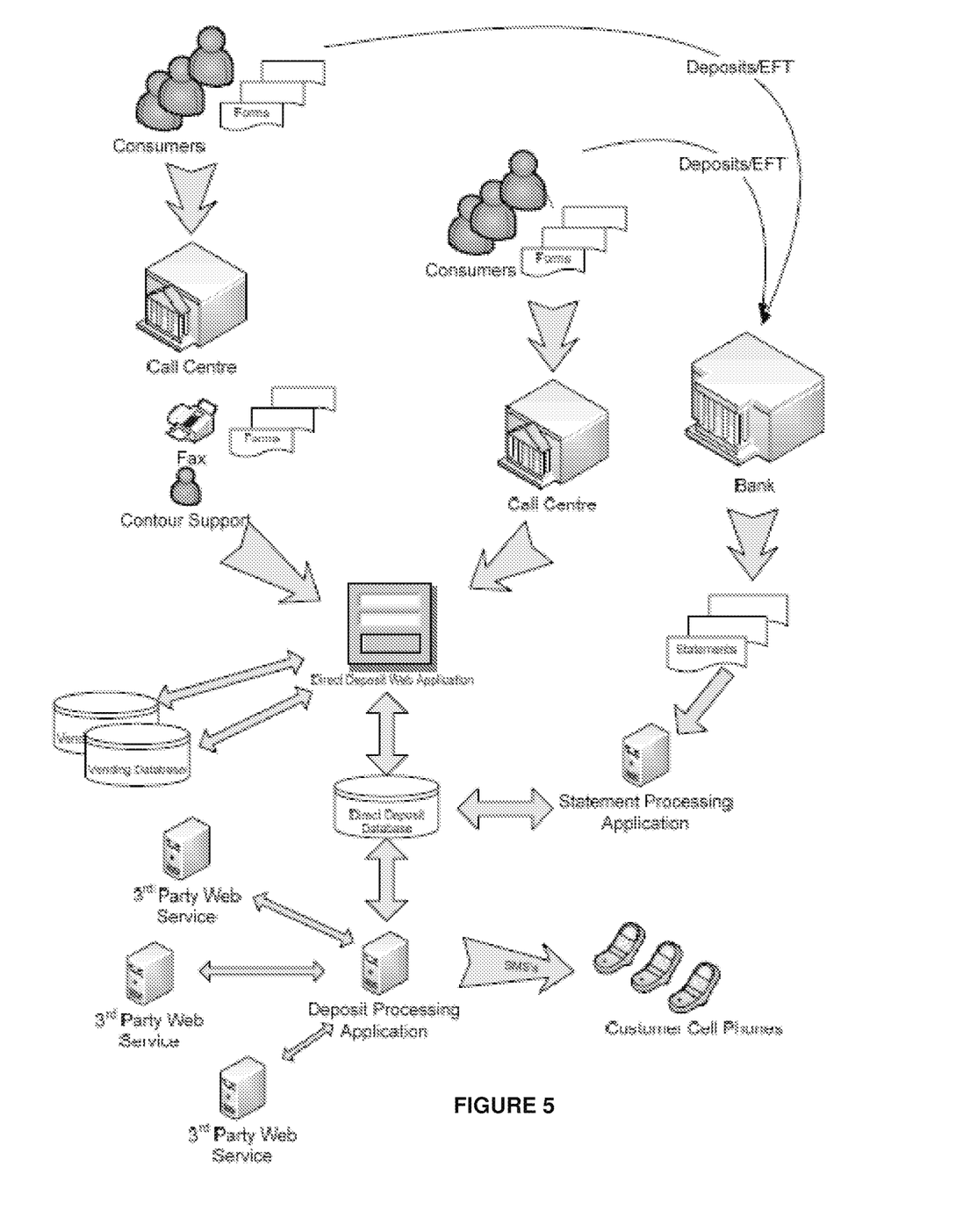
FIG. 5 shows another, differently illustrated, schematic drawing of a network in accordance with an example embodiment.

FIG. 5 illustrates an overview of a system in accordance with an example embodiment. It will be understood that the system illustrated in FIG. 5 operates in substantially the same manner as hereinbefore described.

It will be appreciated that the present invention may also be used for automatic meter readers (AMRs) as well as associated concentrators. The system as described may conveniently identify the meter, the concentrator and hence the meter to download payment thereto.

In other example embodiments, the system may be used to purchase consumable goods or products such as a pizza. The deposit data received for this item causes the system to operate in a similar manner as described above for the purchase of pre-paid electricity, wherein the module 32 is configured to liaise with an associated ordering system of the pizza company involved to process payment thereto, subject to the rule processing module 34 operating on the transaction. The pizza is then delivered accordingly to the user by the pizza company. However, the system sends a confirmation of the transaction being processed to the user shortly after the module 32 determines that the transaction is successful (e.g. by receiving an order confirmation or payment is confirmed by the pizza company).

Figure 6:
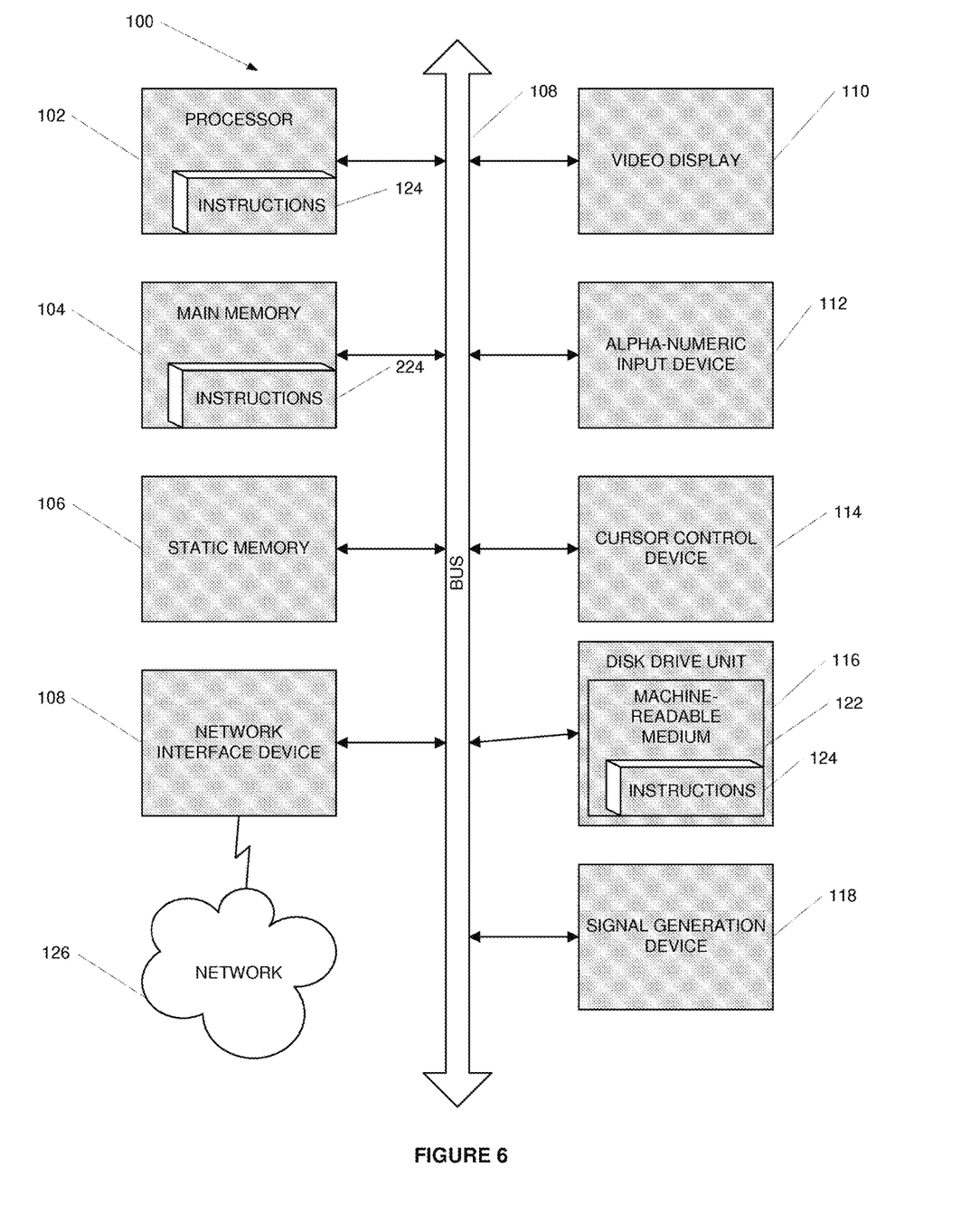
FIG. 6 shows a diagrammatic representation of a machine in the example form of a computer system in which a set of instructions for causing the machine to perform any one or more of the methodologies discussed herein, may be executed.

FIG. 6 shows a diagrammatic representation of machine in the example of a computer system 100 within which a set of instructions, for causing the machine to perform any one or more of the methodologies discussed herein, may be executed. In other example embodiments, the machine operates as a standalone device or may be connected (e.g., networked) to other machines. In a networked example embodiment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated for convenience, the term "machine" shall also be taken to include any collection of machines that individually or jointly execute a set (or multiple sets) of instructions to perform any one or more of the methodologies discussed herein.

In any event, the example computer system 100 includes a processor 102 (e.g., a central processing unit (CPU), a graphics processing unit (GPU) or both), a main memory 104 and a static memory 106, which communicate with each other via a bus 108. The computer system 100 may further include a video display unit 110 (e.g., a liquid crystal display (LCD) or a cathode ray tube (CRT)). The computer system 100 also includes an alphanumeric input device 112 (e.g., a keyboard), a user interface (UI) navigation device 114 (e.g., a mouse, or touchpad), a disk drive unit 116, a signal generation device 118 (e.g., a speaker) and a network interface device 120.

The disk drive unit 16 includes a machine-readable medium 122 storing one or more sets of instructions and data structures (e.g., software 124) embodying or utilised by any one or more of the methodologies or functions described herein. The software 124 may also reside, completely or at least partially, within the main memory 104 and/or within the processor 102 during execution thereof by the computer system 100, the main memory 104 and the processor 102 also constituting machine-readable media.

The software 124 may further be transmitted or received over a network 126 via the network interface device 120 utilising any one of a number of well-known transfer protocols (e.g., HTTP).

Although the machine-readable medium 122 is shown in an example embodiment to be a single medium, the term "machine-readable medium" may refer to a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilised by or associated with such a set of instructions. The term "machine-readable medium" may accordingly be taken to include, but not be limited to, solid-state memories, optical and magnetic media, and carrier wave signals.

The invention as described herein provides a real-time payment mechanism which conveniently applied business rules or customer specific information thereto. The invention provides its functionality in a secure, automated manner with immediate service delivery. The invention provides end customers with the ability to deposit money into a nominated bank account and receive a prepayment token via SMS on a nominated cell phone. The deposit is identified using the STS meter number as a reference number. The reference number is verified and once confirmed, the deposited amount with the reference number is sent in real-time (near real-time) to the system. The system implements various customer specific rules and performs various calculations to determine a net value. In particular, an amount may be deducted for outstanding debt and logged in a database. Once these are calculations are done, e.g. in vending a prepayment electricity token, the token digits are generated for the particular prepayment meter. These token digits and receipt details of the outstanding debt payment will be sent in real time via SMS (Short Message Service), e-mail or fax to the specific customer. These details would have been captured during the registration process.

The invention claimed is:

1. A method of vending a token for a prepaid service, wherein the prepaid service is the provision of a metered commodity delivered through a meter associated with deposit data, the metered commodity selected from the group consisting of electricity, gas and water, wherein the method is carried out by an automated transaction system, the method comprising:
    interfacing the automated transaction system with backend computer systems associated with a plurality of banks, wherein the automated transaction system has an associated system account held at each of the plurality of banks into which deposits of funds may be made;
    receiving, in a real-time or near real-time, from at least one backend computer system associated with at least one bank, the deposit data indicative of a deposit of a financial value made into a system bank account held at the at least one bank, wherein the deposit data comprises information indicative of the amount of financial value deposited into the system bank account and a system reference identifier identifiable by the automated transaction system, wherein the system reference identifier is a bank beneficiary reference associated with the deposit of the financial value or sum of money, wherein the system reference identifier comprises data to enable the automated transaction system to identify the meter which measures the provision of the metered commodity;
    determining, from the deposit data, an identity of the meter associated with the deposit data, wherein the meter facilitates control of provision of the metered commodity;
    associating the financial value deposited, or at least part thereof, with the identified meter in a database;
    determining at least one service token for the metered commodity to be purchased;
    processing, via a processor, purchase of the determined service token for the metered commodity to be purchased;
    applying, via the processor, one or more rules to the processing of the purchase of the determined service token for the metered commodity to be purchased wherein the one or more rules are pre-selected by a user of the system or vendors of the service tokens and are associated with the identified meter;
    generating a transaction confirmation message comprising information associated with a purchased service token for the metered commodity, wherein a purchased service token is associated with a pre-paid amount of the metered commodity;
    transmitting the transaction confirmation message in one or more selected wireless communication formats to an endpoint device, and
    the meter initiates delivery of an amount of the metered commodity in accordance with the pre-paid amount after receiving the purchased service token into the meter associated with the deposit data,
    wherein the meter is a prepaid commodity meter and the backend computer systems associated with the plurality of banks are payment gateway servers associated with the plurality of banks.

2. The method as claimed in claim 1, wherein the deposit data comprises a bank statement associated with the bank account.

3. The method as claimed in claim 1, wherein the identified meter is a registered meter, wherein the method comprises:
    identifying a registered user of or registered meter associated with the automated transaction system from the received deposit data; and
    associating the amount of financial value deposited, or at least part thereof, with the identified registered user of or registered meter associated with the automated transaction system.

4. The method as claimed in claim 1, the method further comprising:
    receiving user information associated with a user or meter to identify the same;
    storing the user information in the database; and
    registering the user or meter to the system such that the user or the meter is a registered user of or registered meter associated with the system.

5. The method as claimed in claim 1, wherein the method further comprises determining one or more rules to apply to the processing of the purchase of the determined service token for the metered commodity, wherein the one or more rules are associated with an identified registered user or registered meter associated with the system.

6. The method as claimed in claim 1, wherein the method further comprises receiving and storing, in the database, one or more rules pre-selected by a user of the system.

7. The method as claimed in claim 1, the method further comprising:
    determining, by way of the processor, a risk profile of a user of the system; and
    selecting, by way of the processor, one or more rules for application to processing of the purchase of the determined service token for the metered commodity based on the determined risk profile of the user.

8. The method of claim 1, wherein the service token is provided after payment.

9. An automated transaction system for a metered service, wherein the metered service is the provision of a metered commodity delivered through a meter associated with deposit data, the metered commodity selected from the group consisting of electricity, gas and water, wherein the system comprises:
    a database storing data including one or more rules pre-selected by users of the system or vendors of the metered commodity for application to processing of purchases of the metered commodity; and a processor communicatively coupled to the database, wherein the processor is interfaced with backend computer systems associated with a plurality of banks, wherein the automated transaction system has an associated system account held at each of the plurality of banks into which deposits of funds may be made, and wherein the processor is:
configured to receive, in a real-time or near real-time, from at least one backend computer system associated with at least one bank, the deposit data indicative of a deposit of a financial value made into a system bank account held at the at least one bank, wherein the deposit data comprises information indicative of the amount of financial value deposited into the system bank account and a system reference identifier identifiable by the automated transaction system, wherein the system reference identifier is a bank beneficiary reference associated with the deposit of the financial value or sum of money, wherein the system reference identifier comprises an identity of the meter which measures the provision of the metered commodity;
configured to determine, from the deposit data, the identity of the meter associated with the deposit data, wherein the meter facilitates control of provision of the metered commodity;
configured to associate the financial value deposited, or at least part thereof, with the identified meter in the database;
configured to determine at least one service token for the metered commodity to be purchased;
configured to process purchase of the determined service token for the metered commodity to be purchased;
configured to apply one or more rules to the processing of the purchase of the determined service token for the metered commodity to be purchased, wherein the one or more rules are associated with the identified meter;
configured to generate a transaction confirmation message comprising information associated with a purchased service token for the metered commodity, wherein a purchased service token is associated with a pre-paid amount of the metered commodity; and
configured to transmit the transaction confirmation message in one or more selected wireless communication formats to an endpoint device, inputting the purchased service token into the meter identified from the deposit data, and the meter identified from the deposit data initiates delivery of an amount of the metered commodity in accordance with the pre-paid amount,
wherein the meter is a prepaid commodity meter, and the backend computer systems associated with the plurality of banks are payment gateway servers associated with the plurality of banks.

10. The system as claimed in claim 9, wherein the backend computer systems associated with the plurality of banks are payment gateway servers associated with the plurality of banks.

* * * * *